US007554715B2

(12) United States Patent
Asai et al.

(10) Patent No.: US 7,554,715 B2
(45) Date of Patent: Jun. 30, 2009

(54) MIRROR DRIVER USING DIAMETRICALLY OPPOSED MECHANICAL BEAMS WITH MIRROR INBETWEEN AND RETINAL SCANNING DISPLAY USING THE SAME

(75) Inventors: Nobuaki Asai, Hashima-gun (JP); Yasuo Nishikawa, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 152 days.

(21) Appl. No.: 11/605,953

(22) Filed: Nov. 30, 2006

(65) Prior Publication Data
US 2009/0141238 A1    Jun. 4, 2009

Related U.S. Application Data

(63) Continuation-in-part of application No. PCT/JP2005/010026, filed on Jun. 1, 2005.

(30) Foreign Application Priority Data

Jun. 3, 2004    (JP)    ............... 2004-165182

(51) Int. Cl.
*G02B 26/00*    (2006.01)
(52) U.S. Cl. .................................... 359/290
(58) Field of Classification Search ................. 359/290, 359/291, 292, 293, 295, 298, 220, 222, 223, 359/320, 323; 355/71
See application file for complete search history.

(56) References Cited

U.S. PATENT DOCUMENTS

| 7,234,813 | B2 * | 6/2007 | Watanabe et al. ........... 351/200 |
| 2003/0053186 | A1 | 3/2003 | Arima |
| 2003/0117687 | A1 | 6/2003 | Murakami et al. |
| 2003/0142086 | A1 | 7/2003 | Watanabe et al. |
| 2005/0094931 | A1 * | 5/2005 | Yokoyama et al. ............ 385/18 |

FOREIGN PATENT DOCUMENTS

| JP | U 63-54121 | 4/1988 |
| JP | A 01-276114 | 11/1989 |
| JP | A 07-065098 | 3/1995 |

(Continued)

OTHER PUBLICATIONS

Schroth, A. et al., "Application of Sol-Gel Deposited Thin PZT Film for Actuation of 1D and 2D Scanners," Jan. 1998, The Eleventh Annual International Workshop on Micro Electro Mechanical Systems, pp. 402-407.

*Primary Examiner*—Hung X Dang
*Assistant Examiner*—Tuyen Q Tra
(74) *Attorney, Agent, or Firm*—Oliff & Berridge, PLC

(57) ABSTRACT

A mirror driver is disclosed which includes: a mirror having a reflective surface reflecting incident light thereon; a pair of mechanical beams diametrically opposed to each other with the mirror inbetween as viewed along a reference line parallel to the reflective surface; an actuator imparting bending motions to the pair of beams, respectively; and a pair of joints integrally coupling the pair of beams and the mirror to each other, with less rigidity to resist deformation than rigidity of the pair of beams and the mirror, for allowing conversion of the bending motions of the pair of beams into a rigid-body motion of the mirror without inducing an angular oscillation about the reference line.

18 Claims, 9 Drawing Sheets

FOREIGN PATENT DOCUMENTS

| | | |
|---|---|---|
| JP | B2 3246106 | 1/2002 |
| JP | A 2003-195204 | 7/2003 |
| JP | A 2003-262803 | 9/2003 |
| JP | A 2003-295108 | 10/2003 |
| WO | WO 03/062899 | 7/2003 |

* cited by examiner

MIRROR DRIVER USING DIAMETRICALLY OPPOSED MECHANICAL BEAMS WITH MIRROR INBETWEEN AND RETINAL SCANNING DISPLAY USING THE SAME

CROSS-REFERENCE TO RELATED APPLICATIONS

This application is based on Japanese Patent Application No. 2004-165182 filed Jun. 3, 2004, and International Application No. PCT/JP2005/010026 filed Jun. 1, 2005, the contents of which are incorporated hereinto by reference.

This application is a continuation-in-part application of International Application No. PCT/JP2005/010026 filed Jun. 1, 2005, now pending, which was published in Japanese under PCT Article 21(2).

BACKGROUND OF THE INVENTION

1. Field of the Invention

The invention relates to techniques of generating a motion of a mirror because of bending motions of a pair of mechanical beams or bars diametrically opposed to each other with the mirror inbetween, and more particularly to techniques of achieving a reduction in deformation of the mirror resulting from the bending motions of the beams or bars.

2. Description of the Related Art

There are known mirror drivers for generating a motion of a mirror because of bending motion of a mechanical beam structure. An example of a conventional mirror driver of such a type is disclosed in Japanese Patent No. 3246106.

In this example, a beam structure is configured such that a pair of mechanical beams coextend in parallel, and such that a mirror is cantilever mounted on the pair of parallel beams at their one ends located on the same side.

In operation, conversion of bending motions of the beams into a motion of the mirror is allowed by joints for coupling the beams and the mirror to each other. For scanning reflected light from the mirror, the motion of the mirror is performed as an angular oscillation or oscillatory rotation about an oscillation axis perpendicular or parallel to a center line of the beam structure.

BRIEF SUMMARY OF THE INVENTION

The present inventors have developed a diametrically-opposed-beam type mirror driver as one of mirror drivers for generating mirror motion using bending motion of a beam structure.

The developed diametrically-opposed-beam type mirror driver is configured to include (a) a mirror having a reflective surface reflecting incident light thereon; and (b) a pair of mechanical beams diametrically opposed to each other with the mirror inbetween as viewed along a reference line parallel to the reflective mirror; and (c) an actuator imparting bending motions to the pair of beams, respectively.

In this diametrically-opposed-beam type mirror driver, ideally, the bending motions of the beams cause displacement of the mirror, without inviting deformation of the mirror. In other words, it is ideal that the bending motions of the beams are converted into a rigid-body motion of the mirror.

In this regard, the rigid-body motion refers to a motion caused by an external force to allow the position of the mirror to change, but not to allow the shape of the mirror to change.

Then, the present inventors have fabricated an experimental model of the diametrically-opposed-beam type mirror driver, for testing the experimental model to verify whether or not the mirror is deformed during the motion of the mirror in the diametrically-opposed-beam type mirror driver.

In the experimental model, the pair of beams are coupled integrally and directly to the mirror, without intervention of any positive hinges configured to be more easily deformable than those beams and the mirror.

The present inventors tested the experimental model, resulting in the findings that, in the experimental model, the bending motions of the beams are likely to cause deformation of the mirror, as described below in greater detail with reference to an associated graph.

It is therefore an object of the present invention to provide techniques of generating a motion of a mirror because of bending motions of a pair of mechanical beams diametrically opposed to each other with the mirror inbetween, which techniques are useful in achieving a reduction in deformation of the mirror due to the bending motions of the beams.

According to a first aspect of the invention, a mirror driver is provided which comprises:

a mirror having a reflective surface reflecting incident light thereon;

a pair of mechanical beams diametrically opposed to each other with the mirror inbetween as viewed along a reference line parallel to the reflective surface;

an actuator imparting bending motions to the pair of beams, respectively; and a pair of joints integrally coupling the pair of beams and the mirror to each other, with less rigidity to resist deformation than rigidity of the pair of beams and the mirror, for allowing conversion of the bending motions of the pair of beams into a rigid-body motion of the mirror without inducing an angular oscillation about the reference line.

According to a second aspect of the invention, a mirror driver is provided which comprises:

a mirror having a reflective surface reflecting incident light thereon;

a pair of mechanical beams diametrically opposed to each other with the mirror inbetween as viewed along a reference line parallel to the reflective surface;

an actuator imparting bending motions to the pair of beams, respectively; and a pair of joints integrally coupling the pair of beams and the mirror to each other, with less rigidity to resist deformation than rigidity of the pair of beams and the mirror, each joint having a length larger than a minimum distance left between a corresponding one of the pair of beams and a corresponding one of opposite ends of the mirror, the length of each joint being measured in an elongation direction of each joint, the minimum distance being measured along the reference line.

According to a third aspect of the invention, there is provided a retinal scanning display for two-dimensionally scanning a light beam on a retina of a viewer, to thereby directly project a desired image onto the retina.

This display comprises:

a light source emitting the light beam;

a wavefront-curvature modulator modulating a curvature of wavefront of the light beam emitted from the light source; and a scanner two-dimensionally scanning the modulated light, wherein at least one of the wavefront-curvature modulator and the scanner is configured to include a mirror driver.

The mirror driver includes:

a mirror having a reflective surface reflecting incident light thereon;

a pair of mechanical beams diametrically opposed to each other with the mirror inbetween as viewed along a reference line parallel to the reflective surface;

an actuator imparting bending motions to the pair of beams, respectively; and a pair of joints integrally coupling the pair of beams and the mirror to each other, with less rigidity to resist deformation than rigidity of the pair of beams and the mirror, for allowing conversion of the bending motions of the pair of beams into a rigid-body motion of the mirror without inducing an angular oscillation about the reference line.

In one embodiment, the pair of joints may be configured such that each joint has a length larger than a minimum distance left between a corresponding one of the pair of beams and a corresponding one of opposite ends of the mirror, the length of each joint being measured in an elongation direction of each joint, the minimum distance being measured along the reference line.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
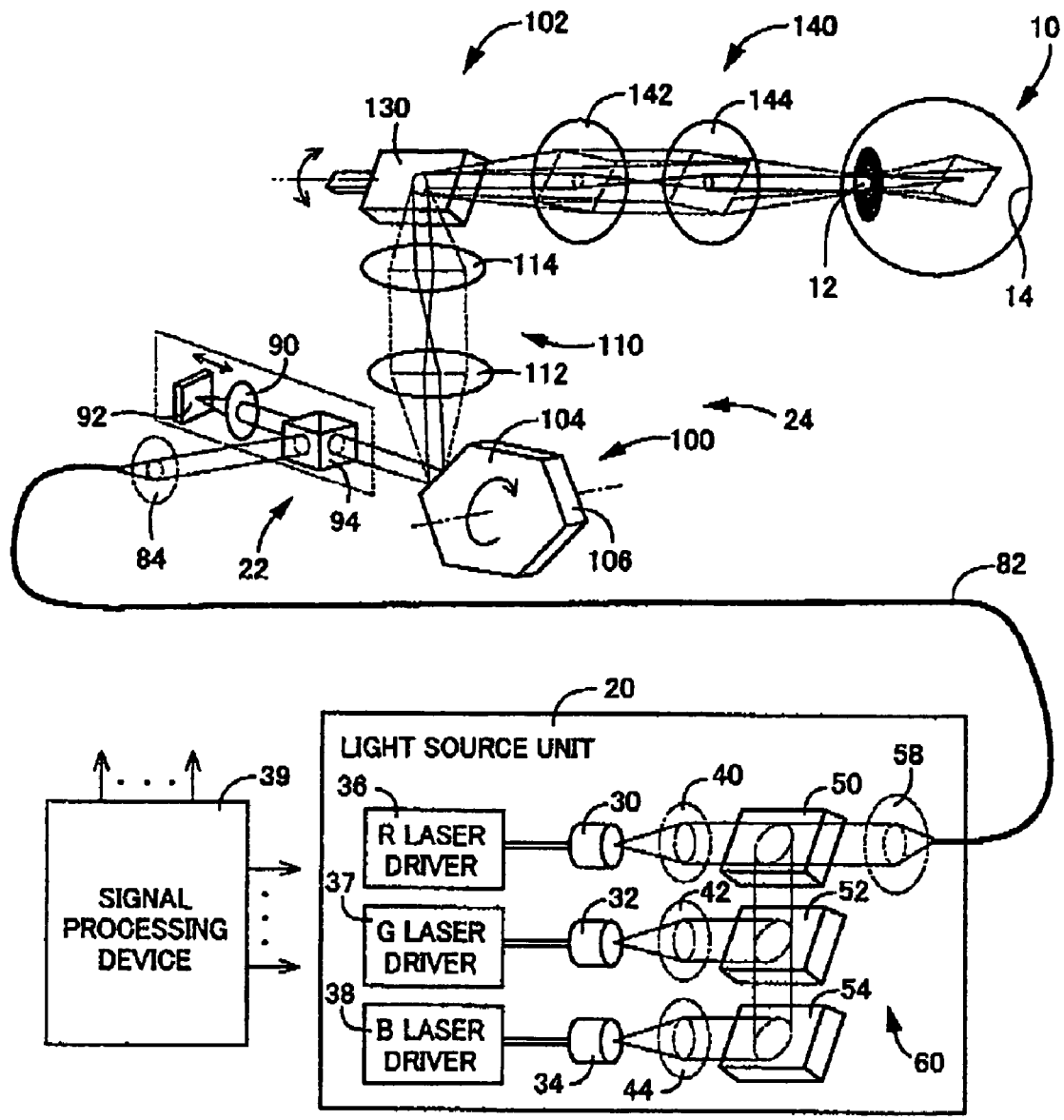
FIG. 1 is a schematic view illustrating a retinal scanning display constructed according to an embodiment of the present invention, together with a signal processing device 39.

The object mentioned above may be achieved according to any one of the following modes of this invention.

These modes will be stated below so as to be sectioned and numbered, and so as to depend upon the other mode or modes, where appropriate. This is for a better understanding of some of a plurality of technological features and a plurality of combinations thereof disclosed in this description, and does not mean that the scope of these features and combinations is interpreted to be limited to the scope of the following modes of this invention.

That is to say, it should be interpreted that it is allowable to select the technological features which are stated in this description but which are not stated in the following modes, as the technological features of this invention.

Furthermore, stating each one of the modes of the invention in such a dependent form as to depend from the other mode or modes does not exclude the possibility that the technological features set forth in a dependent-form mode become independent of those set forth in the corresponding depended mode or modes and to be removed therefrom. It should be interpreted that the technological features set forth in a dependent-form mode are allowed to become independent, where appropriate.

(1) A mirror driver comprising:

a mirror having a reflective surface reflecting incident light thereon;

a pair of mechanical beams diametrically opposed to each other with the mirror inbetween as viewed along a reference line parallel to the reflective surface;

an actuator imparting bending motions to the pair of beams, respectively; and a pair of joints integrally coupling the pair of beams and the mirror to each other, with less rigidity to resist deformation than rigidity of the pair of beams and the mirror, for allowing conversion of the bending motions of the pair of beams into a rigid-body motion of the mirror without inducing an angular oscillation about the reference line.

In general, in an instance where a mechanical beam is coupled to a mirror integrally and directly, without intervention of any positive hinges, if the beam is imparted a bending motion, then not only a force acting in a direction normal to a reflective surface of the mirror, but also a bending moment are transmitted from the beam to the mirror.

In a particular one of the instances where a pair of mechanical beams are diametrically opposed to each other with a mirror inbetween, if the mirror is translated in a direction normal to the reflective surface, using bending motions occurring in the pair of beams, then bending moments having opposite directions are transmitted from the pair of beams to the mirror, respectively.

The above positive-hinge less configuration makes the mirror prone to warp, and additionally makes the pair of beams less bendable, resulting in a reduction in shape stability of the reflective surface of the mirror during motion, especially translational motion, and additionally resulting in a reduction in a displacement amount of the reflective surface in its optical axis.

In contrast, in the mirror driver according to the present mode, a pair of mechanical beams and a mirror are coupled integrally to each other by a pair of joints having less rigidity to resist deformation than rigidity of the pair of beams and the mirror.

The pair of joints act as positive hinges configured to be more easily deformable than the pair of beams and the mirror, enabling conversion of the bending motions of the pair of beams into a rigid-body motion of the mirror without inducing an angular oscillation about the aforementioned reference line.

This mirror driver would therefore eliminate or reduce the likelihood of the mirror to be deformed due to the bending motions of the beams, to a level lower than that in the case where the beams are directly coupled to the mirror.

Each of the "pair of joints" set forth in the present mode may be embodied in an arrangement in which, for achieving the rigidity to resist deformation less than that of the neighboring areas, each joint couples a corresponding one of the beams and the mirror to each other, not so as to form a shortest elongation path as viewed along the reference line, but so as to form a longer elongation path than the shortest elongation path.

In this arrangement, the longer elongation path may be in the form of a non-rectilinear elongation path (e.g., an L-shaped bent elongation path, an arc-shaped curved elongation path).

Further, each of the "pair of joints" set forth in the present mode may be embodied in an arrangement in which, for achieving the rigidity to resist deformation less than that of the neighboring areas, each joint is shaped to have a width and/or thickness dimension smaller than that of the neighboring areas, for example.

The "actuator" set forth in the present mode may be of a type allowing the actuator to be directly attached to the pair of beams, or of a type allowing the actuator to be attached to a support member supporting the pair of beams in common.

Further, the "actuator" set forth in the present mode may be of a type allowing the actuator to be attached to the pair of beams individually, or of a type allowing the actuator to be attached to the pair of beams in common (e.g., including the aforementioned type allowing the actuator to be attached to the common support member).

The "pair of beams" set forth in the present mode may be arranged such that each beam is plate-shaped, and the thus-shaped beams are disposed coplanar with the mirror so as to form a straight line, for example.

The term "rigidity to resist deformation" set forth in the present mode and the following modes is typically defined to mean the magnitude of the resistance of each joint to deformation (e.g., bending or torsion of each joint). The magnitude of the resistance to deformation refers to, for example, a ratio between a force applied to each joint for deformation and a resulting displacement of each joint.

In addition, the term "rigidity to resist deformation" is defined to include at least one of flexural rigidity and torsional rigidity.

Further, the "rigidity to resist deformation" may be defined, in some occasions, by depending on the properties of each joint as such, independently of a distance of each joint from the neutral line of each beam in some occasions, and may be defined by depending on distances of each segment of each joint from the neutral line of each beam, which is to say, by depending on the geometry of each beam and each joint, in other occasions.

(2) The mirror driver according to mode (1), wherein the rigid-body motion includes at least one of a translational motion of the mirror in a direction perpendicular to the reflective surface, and an angular oscillation of the mirror about an oscillation axis perpendicular to the reference line.

The "translational motion" set forth in the present mode may be used for, for example, moving a reflection point formed on the reflective surface along a vertical optical axis of the reflective surface, without varying an angle at which incoming light enters the reflective surface or an angle at which the light is reflected from the reflective surface.

In addition, the "angular oscillation" set forth in the present mode may be used for, for example, varying an angle at which light is reflected from the reflective surface, which is to say, deflecting light, without moving a point of incidence formed on the reflective surface.

(3) A mirror driver comprising:

a mirror having a reflective surface reflecting incident light thereon;

a pair of mechanical beams diametrically opposed to each other with the mirror inbetween as viewed along a reference line parallel to the reflective surface;

an actuator imparting bending motions to the pair of beams, respectively; and a pair of joints integrally coupling the pair of beams and the mirror to each other, with less rigidity to resist deformation than rigidity of the pair of beams and the mirror, each joint having a length larger than a minimum distance left between a corresponding one of the pair of beams and a corresponding one of opposite ends of the mirror, the length of each joint being measured in an elongation direction of each joint, the minimum distance being measured along the reference line.

In the mirror driver according to the present mode, a pair of mechanical beams and a mirror are coupled integrally to each other by a pair of joints, similarly with the mirror driver according to the above mode (1). The pair of joints have less rigidity to resist deformation than rigidity of the pair of beams and the mirror.

Further, in the mirror driver according to the present mode, each joint has a length larger than a minimum distance left between a corresponding one of the pair of beams and a corresponding one of opposite ends of the mirror. The length of each joint is measured in an elongation direction of each joint, while the minimum distance is measured along the aforementioned reference line.

This mirror driver would therefore make it easier to reduce the rigidity to resist deformation of each joint to a level lower than the rigidity of neighboring areas of each joint, than when each joint has a length equal to the minimum distance.

For example, this mirror driver would reduce torsional rigidity of each joint to a level lower than the rigidity of its neighborhood, to thereby promote partial conversion of the bending motions of the beams into the torsional motion of the mirror, while preventing direct transmission of the bending motions of the beams to the mirror.

As a result, this mirror driver would make it easier to reduce deformation (e.g., bending) of the mirror due to the bending motions of the beams.

The "pair of joints" set forth in the present mode may be used for converting the bending motions of the pair of beams into translational motion of the mirror occurring perpendicularly to the reflective surface of the mirror, into angular oscillation of the mirror about an oscillation axis perpendicular to the aforementioned reference line, or into angular oscillation of the mirror about the reference line.

This mirror driver according to the present mode may be practiced in an arrangement in which the pair of joints are coupled at their one ends to each of the beams at two beam-side connection points thereon, and in which the pair of joints are coupled at their opposite ends to the mirror at two mirror-side connection points thereon, which are more spaced apart than the beam-side connection points.

This arrangement allows the mirror-side connection points to be disposed spaced apart greatly for the width dimension of the corresponding beam, resulting in easier prevention of the mirror-side connection points from being disposed on a center line of the mirror. As the mirror-side connection points become farther from the center line, the mirror becomes less prone to warp. The disposition of the mirror-side connection points in the above manner is effective in reducing undesirable warp of the mirror especially on the center line.

(4) The mirror driver according to any one of modes (1)-(3), wherein each of the pair of joints is configured to include a beam-side beam portion proximate to a corresponding one of the pair of beams, and a mirror-side beam portion proximate to a corresponding one of opposite ends of the mirror, such that the beam-side beam portion and the mirror-side beam portion are coupled to each other integrally and non-rectilinearly.

This mirror driver, irrespective of each joint being integrally formed, enables each joint to be configured such that deformation-characteristic (e.g., rigidity to resist deformation) of each joint varies between near the corresponding beam and near the mirror.

(5) The mirror driver according to mode (4), wherein the beam-side beam portion and the mirror-side beam portion have different lengths.

This mirror driver enables each joint to be configured such that a portion of each joint proximate to the corresponding beam, and a portion of each joint proximate to the mirror are different in length, to thereby allow deformation-characteristic (e.g., rigidity to resist deformation) of each joint to vary between near the corresponding beam and near the mirror.

(6) The mirror driver according to mode (4) or (5), wherein the beam-side beam portion and the mirror-side beam portion have respective center lines extending in different directions.

This mirror driver enables each joint to be configured such that a portion of each joint proximate to the corresponding beam, and a portion of each joint proximate to the mirror have respective center lines extending in different directions, to thereby allow deformation-characteristic (e.g., rigidity to resist deformation) of each joint to vary between near the corresponding beam and near the mirror.

(7) The mirror driver according to mode (6), wherein the beam-side beam portion extends from the corresponding beam in a direction having a major component perpendicular to the reference line, and the mirror-side beam portion extends from the mirror in a direction having a major component parallel to the mirror.

In this mirror driver, each joint is configured such that each joint includes (a) a beam-side beam portion and (b) a mirror-side beam portion, and such that these beam portions are arrayed in series in the description order, as viewed in a direction from the beams toward the mirror.

In this regard, the "beam-side beam portion" is a portion of each joint which extends from the beams in a direction having a major component perpendicular to the aforementioned reference line. An example of the direction is a direction substantially perpendicular to the reference line.

Additionally, the mirror-side beam portion is a portion of each joint which extends from the mirror in a direction having a major component parallel to the mirror. An example of the direction is a direction substantially parallel to the aforementioned reference line.

As a result, this mirror driver would increase the tendency that part of the bending motions of the beams is converted into a torsional motion of the beam-side beam portion, while the remainder of the bending motions of the beams is directly transmitted to the mirror to cause bending motion, when compared with an example where each joint is configured to include the aforementioned mirror-side beam portion, but not to include the aforementioned beam-side beam portion.

This mirror driver would therefore make it easier to reduce deformation of the mirror due to the bending motions of the beams.

(8) The mirror driver according to any one of modes (4)-(7), wherein the beam-side beam portion extends from one of opposite ends of the corresponding beam, which is proximate to the mirror, the one end of the corresponding beam being a mirror-side end of the corresponding beam, and the mirror-side beam portion extends from one of the opposite ends of the mirror, which is proximate to the corresponding beam, the opposite ends of the mirror being spaced apart in the direction of the reference line, the one end of the mirror being a beam-side end of the mirror.

(9) The mirror driver according to mode (8), wherein the mirror-side end of the corresponding beam has lateral faces opposite to each other in a width direction of the corresponding beam, the beam-side end of the mirror has a front face facing the beam-side end of the corresponding beam, the beam-side beam portion of each joint includes a pair of coextending beam-side beam elements, the mirror-side beam portion of each joint includes a pair of coextending mirror-side beam elements, the pair of beam-side beam elements are attached to the opposite lateral faces of the mirror-side end of the corresponding beam, respectively, with the pair of beam-side beam elements being spaced apart in a direction parallel to the width direction of the corresponding beam, and the pair of mirror-side beam elements are attached to the front face of the beam-side end of the mirror, with the pair of mirror-side beam elements being spaced apart in the width direction of the corresponding beam, by a distance larger than a width of the corresponding beam.

In this mirror driver, each joint coupling each beam and the mirror to each other is configured to include a pair of parallel-extending beam-side beam elements spaced apart in the width direction of each beam, and a pair of parallel-extending mirror-side beam elements spaced apart in the width direction of each beam.

Further, in this mirror driver, the pair of mirror-side beam elements are disposed spaced apart by a distance larger than a width of the corresponding beam.

This mirror driver would therefore make it ease to prevent the normal direction to the reflective surface of the mirror from swinging in unexpected directions with respect to the orientation of the beams, during motion of the mirror, when compared with an example where the pair of mirror-side beam elements are disposed spaced apart only by a distance smaller than the width of the corresponding beam.

As a result, this mirror driver would facilitate stabilized motion of the mirror.

(10) The mirror driver according to any one of modes (1)-(9), wherein each of the pair of beams has a width smaller than that of the mirror.

(11) The mirror driver according to any one of modes (1)-(10), further comprising:

an additional pair of mechanical beams diametrically opposed to each other with the mirror inbetween as viewed along an additional reference line parallel to the reflective surface and perpendicular to the original reference line;

an additional actuator imparting bending motions to the additional pair of beams, respectively; and an additional pair of joints integrally joint the additional pair of beams and the mirror to each other, with less rigidity to resist deformation than rigidity of the additional pair of beams and the mirror.

In this mirror driver, the mirror is actuated using both a first pair of mechanical beams diametrically opposed and coaxially aligned with a first reference line, and a second pair of mechanical beams diametrically opposed and coaxially aligned with a second reference line perpendicular to the first reference line, which is to say, two pairs of mechanical beams disposed orthogonal.

This mirror driver would therefore allow correction for tilt of the mirror with greater ease than when the mirror is actuated using only one pair of beams.

(12) The mirror driver according to any one of modes (1)-(11), wherein the pair of joints are configured to allow conversion of the bending motions of the pair of beams into a translational motion of the mirror in a direction perpendicular to the reflective surface of the mirror.

This mirror driver would allow the reflective surface of the mirror to be translated, owing to the bending motions of the beams, in a direction perpendicular to the reflective surface, with the orientation of the reflective surface being kept unchanged.

(13) The mirror driver according to mode (12), which is used in combination with a lens, the mirror driver further comprising a controller controlling a distance between the lens and the mirror, by causing the actuator to bend the pair of beams, to thereby modulate a curvature of wavefront of light upon entry from the lens into the mirror.

This mirror driver is used for varying a position at which light, upon entry from the lens into the reflective surface of the mirror, is reflected from the reflective surface, along its optical axis. The lens is disposed at a position allowing its focal point to be located on the reflective surface of the mirror.

The light, upon reflected from the reflective surface, enters the lens again. If the reflective surface is deviated from a position allowing the focal point of the lens to be located on the reflective surface, then an apparent light-emission point is caused to move, at which light is apparently emitted from the reflective surface toward the lens. This results in modulation in curvature of wavefront of outgoing light from the lens.

(14) The mirror driver according to any one of modes (1)-(11), wherein the pair of joints are configured to allow conversion of the bending motions of the pair of beams into an angular oscillation of the mirror about an oscillation axis perpendicular to the reference line.

This mirror driver would allow the mirror to be angularly oscillated not about an oscillation axis parallel to the center line of the beams, but about an oscillation axis perpendicular to the center line of the beams.

(15) The mirror driver according to mode (14), which is used for varying a reflection direction of reflected light from the mirror, to thereby scan the reflected light.

(16) A retinal scanning display for two-dimensionally scanning a light beam on a retina of a viewer, to thereby directly project a desired image onto the retina, the display comprising:

a light source emitting the light beam;

a wavefront-curvature modulator modulating a curvature of wavefront of the light beam emitted from the light source; and a scanner two-dimensionally scanning the modulated light, wherein at least one of the wavefront-curvature modulator and the scanner is configured to include a mirror driver set forth in any one of mode (1)-(15).

Several presently preferred embodiments of the invention will be described in detail by reference to the drawings in which like numerals are used to indicate like elements throughout.

Referring first to FIG. 1, a retinal scanning display (hereinafter, abbreviated to "RSD") constructed according to one embodiment of the present invention is schematically illustrated.

This RSD is adapted to allow a laser beam (i.e., an example of the "light beam" set forth in the above mode (16)), with the light-intensity and curvature of wavefront being properly modulated, to impinge onto a retina 14 through a pupil 12 of a viewer's eye 10, and allow the laser beam to be two-dimensionally scanned on the retina 14, to thereby directly project a desired image onto the retina 14.

This RSD includes a light source unit 20, and a wavefront-curvature modulator 22 and a scanner 24 both of which are disposed between the light source unit 20 and the viewer's eye 10 and which are arranged in the description order.

For a single laser beam of any color to be generated by combining three laser beams of three primary colors (RGB), the light source unit 20 includes an R laser 30 emitting a red-colored laser beam, a G laser 32 emitting a green-colored laser beam, and a B laser 34 emitting a blue-colored laser beam. These lasers 30, 32, and 34 each may be constructed as a semiconductor laser, for example.

As illustrated in FIG. 1, to each laser 30, 32, 34, there is electrically connected a corresponding one of laser drivers 36, 37, and 38.

To the laser driver 36 corresponding to the R laser 30, there is supplied from a signal processing device 39 an R signal in the form of a light-intensity signal for modulating the light intensity of a red-colored laser beam.

To the laser driver 37 corresponding to the G laser 32, there is supplied from the signal processing device 39 a G signal in the form of a light-intensity signal for modulating the light intensity of a green-colored laser beam.

To the laser driver 38 corresponding to the B laser 34, there is supplied from the signal processing device 39 a B signal in the form of a light-intensity signal for modulating the light intensity of a blue-colored laser beam.

Each laser driver 36, 37, 38 applies a corresponding voltage (electric energy) to a corresponding one of the lasers 30, 32, and 34 in response to a corresponding one of the light-intensity signals entered. Each laser 30, 32, 34 is adapted to emit a corresponding one of the three laser beams, with the light intensity modulated by each laser 30, 32, 34 in response to a corresponding voltage applied.

As illustrated in FIG. 1, upon exit from each laser 30, 32, 34, a laser beam is caused to enter a corresponding one of dichroic mirrors 50, 52, and 54 after collimation by a corresponding one of collimating optical systems 40, 42, and 44.

On these dichroic mirrors 50, 52, and 54, transmission and reflection of a laser beam occur in a wavelength-selective manner, allowing three colored laser beams to be combined into a single laser beam. The dichroic mirror 54 may be replaced with a total-reflection mirror.

More specifically, a red-colored laser beam emitted from the R laser 30 is caused to enter the dichroic mirror 50 after collimated by the collimating optical system 40. A green-colored laser beam emitted from the G laser 32 is caused to enter the dichroic mirror 52 through the collimating optical system 42. A blue-colored laser beam emitted from the B laser 34 is caused to enter the dichroic mirror 54 through the collimating optical system 44.

Upon entry into the three dichroic mirrors 50, 52, and 54, three colored laser beams are combined, and then are coupled to an optical fiber 82 owing to a combining optical system 58.

The light source unit 20 described above emits a laser beam at the combining optical system 58.

Upon exit from the combining optical system 58, the laser beam is relayed via the optical fiber 82 functioning as a light transmitting medium, to a collimating optical system 84. The collimating optical system 84 is adapted to collimate the laser beam entered from the optical fiber 82. Upon exit from the collimating optical system 84, the laser beam enters the wavefront-curvature modulator 22.

This wavefront-curvature modulator 22 is an optical system for modulating the curvature of wavefront of a laser beam emitted from the light source unit 20.

This wavefront-curvature modulator 22 may be of a type, although it is inessential to practice the present invention, allowing the wavefront-curvature modulation per each pixel of an image to be projected onto the retina 14, or alternatively, may be of a type allowing the wavefront-curvature modulation per each frame of an image. The wavefront-curvature modulation causes the in-focus-position of a displayed image to change in accordance with the modulated curvature of wavefront.

In any case, this wavefront-curvature modulator 22 modulates the curvature of wavefront of a laser beam entering this wavefront-curvature modulator 22, in response to a depth signal entered from the signal processing device 39.

In this wavefront-curvature modulator 22, a laser beam incoming from the collimating optical system 84 in the form of parallel light is transformed into converging light by means of a converging lens 90. The converging light into which parallel light has been transformed is transformed into diverging light due to reflection by means of a mirror 92.

The diverging light into which the converging light has been transformed, passes through the converging lens 90 again, and then leaves the wavefront-curvature modulator 22 as a laser beam having a desired curvature of wavefront.

Figure 2:
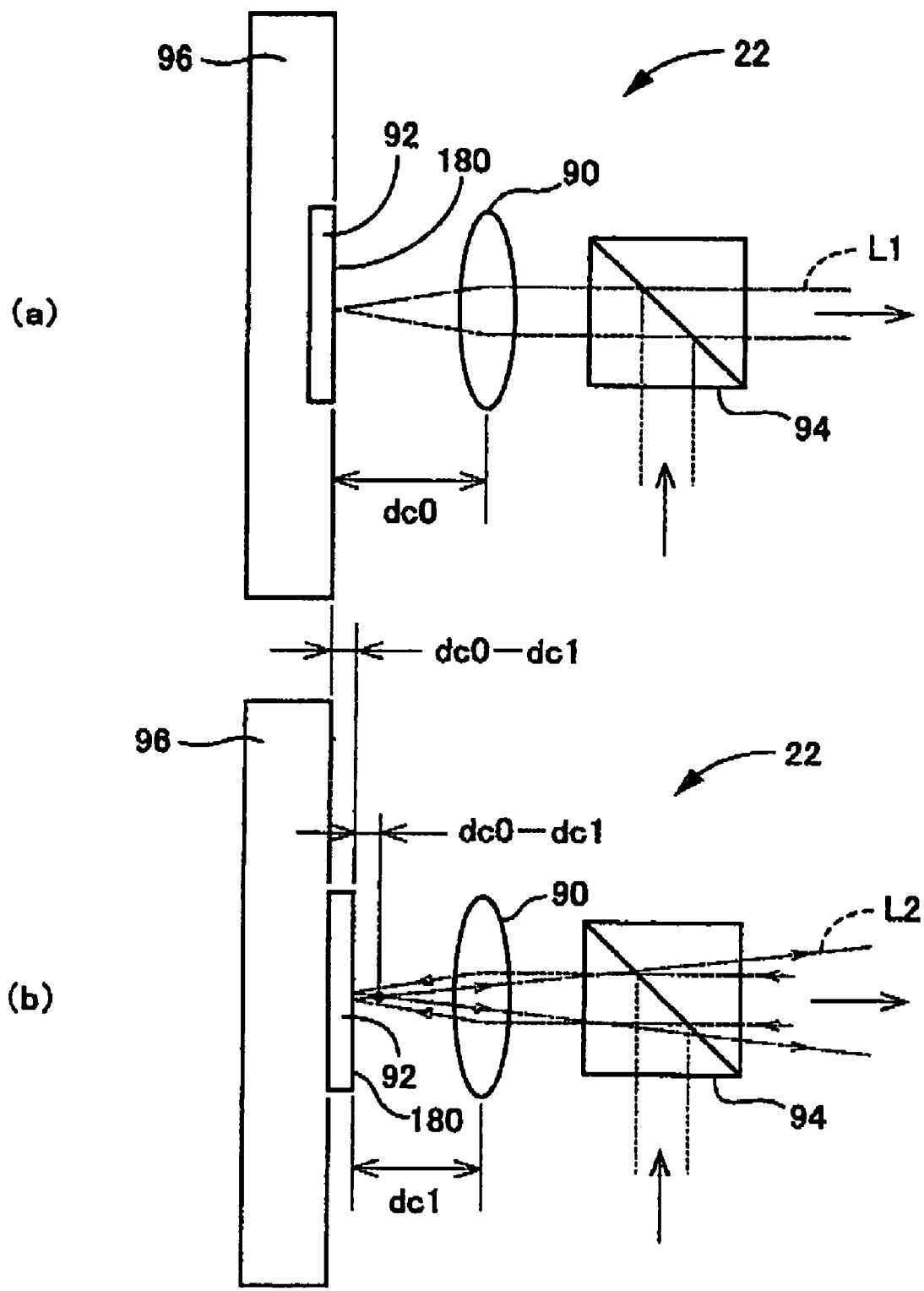
FIG. 2 is a side view for explanation of operational states of a wavefront-curvature modulator 22 depicted in FIG. 1.

Referring next to FIG. 2, this wavefront-curvature modulator 22 is illustrated in enlargement. As illustrated in FIG. 2, this wavefront-curvature modulator 22 includes: a beam splitter 94 causing a laser beam entered from the outside to be reflected from or passed through the wavefront-curvature modulator 22; the converging lens 90 to converge the laser beam entered thereinto through the beam splitter 94; and the mirror 92 to reflect the laser beam converged by the converging lens 90.

In the wavefront-curvature modulator 22 constructed as described above, a laser beam entered from the collimating optical system 84 is reflected from the beam splitter 94 into the converging lens 90 and is then reflected from the mirror 92. Thereafter, the laser beam passes through the converging lens 90 again, and then passes through the beam splitter 94 toward the scanner 24.

The wavefront-curvature modulator 22 varies a distance dc between the converging lens 90 and the mirror 92 by the use of a mirror driver 96, to thereby modulate the curvature of wavefront of a laser beam entered from the collimating optical system 84 toward the scanner 24.

The mirror driver 96 is adapted to cause the mirror 92 to move toward or away from the converging lens 90, to thereby vary the distance dc, as described below in greater detail.

As illustrated in FIG. 2(a), when the distance do is equal to a predetermined initial value dc0, which is to say, the focal length of the converging lens 90, a laser beam entered from the collimating optical system 84 is focused at and reflected from a reflective surface of the mirror 92.

The reflected laser beam travels through the converging lens 90 toward the scanner 24 as parallel light L1 which is the same as the laser beam which was entered from the collimating optical system 84.

On the other hand, as illustrated in FIG. 2(b), when the distance dc has varied to a distance dc1 which is smaller than the initial value dc0, a laser beam entered from the collimating optical system 84, before focused, is reflected from the reflective surface of the mirror 92, because the mirror 92 is positioned closer to the converging lens 90 than the focal point of the converging lens 90.

Upon reflection, the laser beam is focused at a position located forward by a distance (dc0 minus dc1) from the mirror 92. As a result, the laser beam is transformed into diverging light L2 having a positive curvature of wavefront, which is more diverged than the parallel light (curvature of wavefront=0) which entered from the collimating optical system 84.

The diverging light L2 travels through the converging lens 90 toward the scanner 24.

To summarize, a laser beam traveling from the wavefront-curvature modulator 22 toward the scanner 24 is diverging light having the radium of curvature becoming smaller as the distance dc becomes smaller.

In the present embodiment, the initial value dc0 of the distance dc is set to 4 mm, and this RSD is configured such that the radius of curvature of a laser beam varies from a maximum value (e.g., 10 m) to a minimum value (e.g., 20 cm) as the distance dc is reduced from the initial value dc0 within a range of 30 μm.

Generally, the radius of curvature of wavefront of a laser beam is expressed as a reciprocal number of the curvature of wavefront of a laser beam. As this radius of curvature becomes smaller, a viewer perceives a virtual image formed based on a laser beam at a position closer to the viewer.

Therefore, the viewer perceives a virtual image at a position closer to the viewer, as the distance dc is caused to become smaller.

As illustrated in FIG. 1, a laser beam, upon leaving the wavefront-curvature modulator 22 described above, enters the scanner 24. This scanner 24 includes a horizontal scanning system 100 and a vertical scanning system 102.

The horizontal scanning system 100 is an optical system which performs a raster scan allowing a laser beam to be scanned horizontally, per each frame of an image to be displayed. On the other hand, the vertical scanning system 102 is an optical system which performs a vertical scan allowing a laser beam to be scanned vertically, per each frame of an image to be displayed.

More specifically, in the present embodiment, the horizontal scanning system 100 includes a polygon mirror 104 as a unidirectionally-rotating mirror causing mechanical deflection.

The polygon mirror 104 is rotated about an axis of rotation which intersects with respect to the optical axis of a laser beam entered into the polygon mirror 104, at a higher rate, by means of a motor (not shown). The rotational speed of the polygon mirror 104 is controlled in response to a horizontal scan sync signal supplied from the signal processing device 39.

The polygon mirror 104, which includes a plurality of mirror facets 106 positioned around the axis of rotation of the polygon mirror 104, performs a single cycle of deflection of a laser beam, each time an incoming laser beam passes through one of the mirror facets 106.

Upon deflection, the laser beam is relayed to the vertical scanning system 102 via a relay optical system 110. In the present embodiment, the relay optical system 110 includes a plurality of lens systems 112 and 114 in series along the optical path.

While the horizontal scanning system 100 has been described above, the vertical scanning system 102 includes a galvanometer mirror 130 as an angularly-oscillating mirror causing mechanical deflection.

The galvanometer mirror 130 is arranged to allow a laser beam emerged from the horizontal scanning system 100, to be collected by the relay optical system 110 and enter the galvanometer mirror 130.

The galvanometer mirror 130 is oscillated about an axis of rotation intersecting with respect to the optical axis of the laser beam entering the galvanometer mirror 130. The start-up timing and the rotational speed of the galvanometer mirror 130 are controlled in response to a vertical scan sync signal supplied from the signal processing device 39.

The horizontal scanning system 100 and the vertical scanning system 102 both described above cooperate together to two-dimensionally scan a laser beam, whereby an image represented by the scanned laser beam impinges on the viewer's eye 10 via a relay optical system 140. In the present embodiment, the relay optical system 140 includes a plurality of lens systems 142 and 144 in series along the optical path.

Now, the aforementioned mirror driver 96 will be described below in greater detail with reference to FIGS. 3(a) and 3(b).

In FIGS. 3(a) and 3(b), the mirror driver 96 is respectively illustrated in perspective view. In this mirror driver 96, the mirror 92 and a plurality of beams 150 are integrally formed into an integrally-formed portion 152 made of silicon. In FIG. 3(a), the integrally-formed portion 152 is illustrated in perspective view.

As illustrated in FIG. 3(a), in the present embodiment, four plate-shaped beams 150 are disposed coplanar with the plate-shaped mirror 92. The four beams 150 radially extend from the mirror 92 and are uniformly disposed around the mirror 92.

The four beams 150 includes a first beam pair 160 comprised of two of the four beams 150 which are axially aligned with the mirror 92 being interposed between the two beams 150, and a second beam pair 162 comprised of remaining two of the four beams 150 which are axially aligned with the mirror 92 being interposed between the remaining two beams 150.

The center line passing through the first beam pair 160 is a first reference line 164, and the center line passing through the second beam pair 162 is a second reference line 166. These first and second reference lines 164 and 166 are disposed orthogonal to each other at the center point of the mirror 92 as viewed from above the integrally-formed portion 152.

Each beam 150 is coupled its one end to the mirror 92, and is cantilever mounted its other end to a support (not shown). That is to say, it can be said that each beam 150 acts as a cantilever, provided that a coupling end of each beam 150 to the mirror 92 is regarded as a free end.

In this mirror driver 96, to the four beams 150 of the integrally-formed portion 152, four plate-shaped actuators 170 are attached directly and individually. Each actuator 170 may be in the form of a piezoelectric material (e.g., PZT), for example. In FIG. 3(b), this mirror driver 96 is illustrated in perspective view with the actuators 170 being attached to the integrally-formed portion 152.

Figure 3:
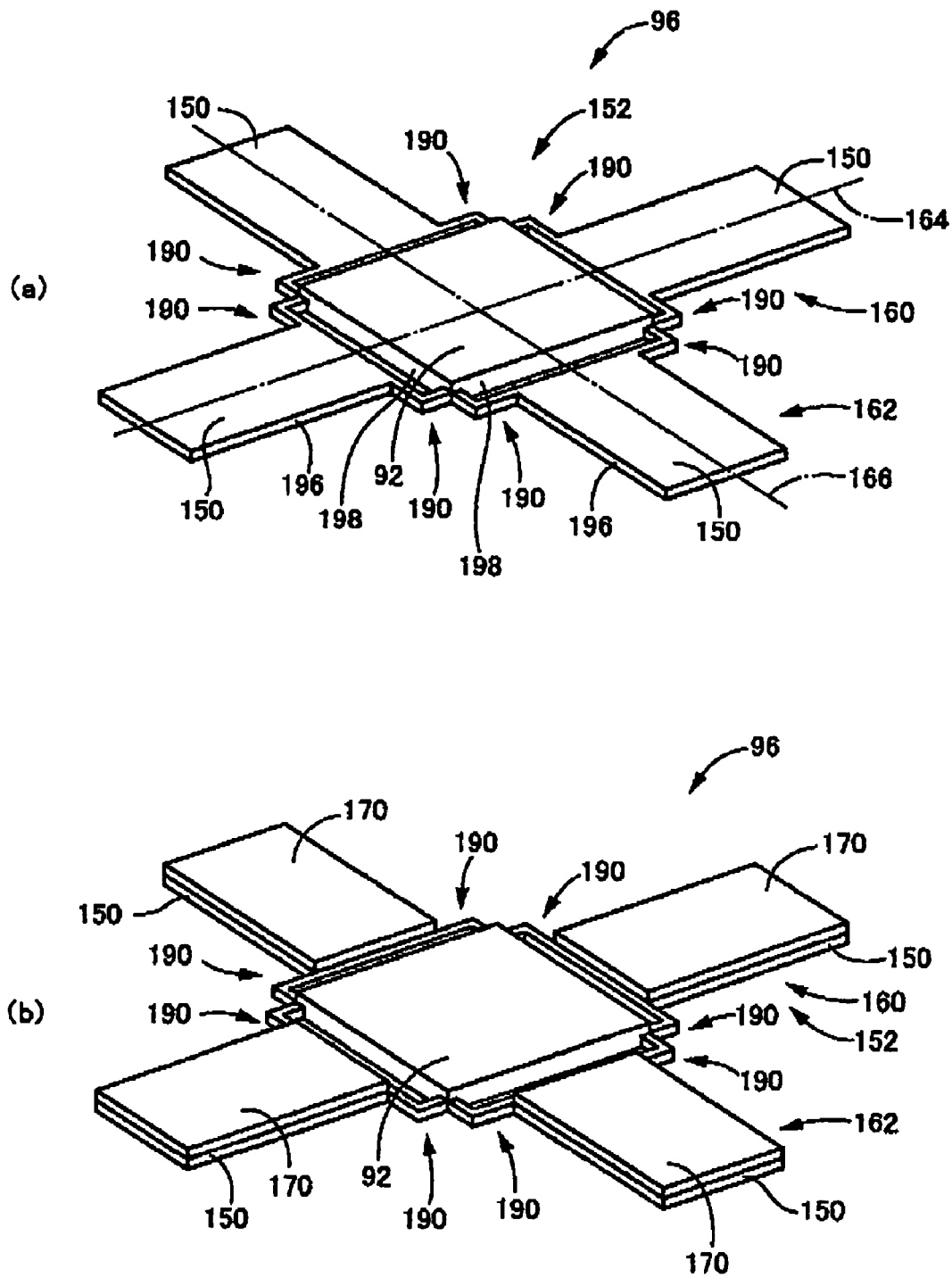
FIG. 3 is a perspective view illustrating a mirror driver 96 depicted in FIG. 2.
Figure 4:
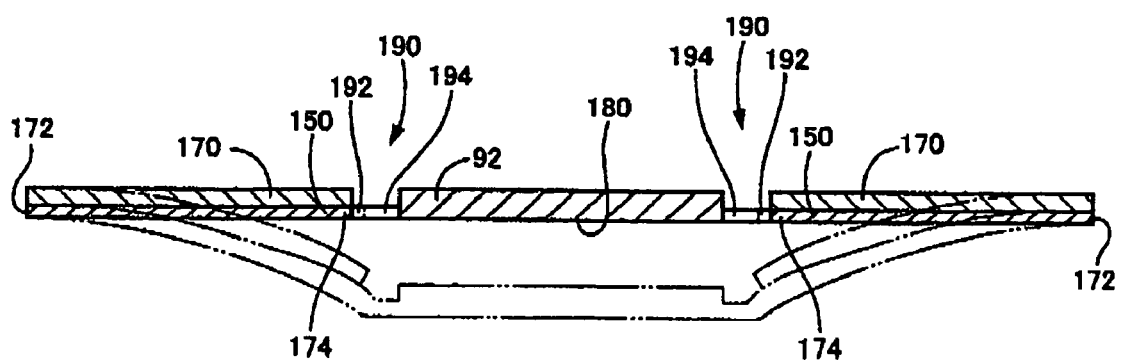
FIG. 4 is a side sectional-view illustrating the mirror driver 96 depicted in FIG. 3.

Each actuator 170 is a piezoelectric unimorph constructed by attaching each actuator 170 onto a single side of a corresponding one of the beams 150. Lengthwise expansion of each actuator 170 in response to voltage application causes the corresponding beam 150 to be placed from a normal state illustrated in FIG. 3(b) into a flexed state. In FIG. 4, the beams 150 placed in the normal state are illustrated in solid lines, while the beams 150 placed in the flexed state are illustrated in phantom lines.

As illustrated in FIG. 4, at one of opposite ends of each beam 150, each beam 150 is supported by the aforementioned support, with the one end acting as a fixed end 172. At the other of the opposite ends of each beam 150, each beam 150 is coupled to the mirror 92, with the other end acting as a movable end 174 which is displaced owing to the operation of the corresponding actuator 170.

As illustrated in FIG. 4, two of the actuators 170 are attached to a pair of beams 150 and 150 which are diametrically opposed to each other with the mirror 92 being interposed between the pair of beams 150 and 150. The two actuators 170 and 170 will be referred hereinafter also to "pair of actuators 170 and 170." To the pair of actuators 170 and 170, voltages are respectively applied concurrently, with the conditions and phases being matched.

Upon voltage application to each actuator 170, the movable end 174 of the corresponding beam 150 is displaced from an inactive position illustrated in FIG. 4 in solid lines, to an active position illustrated in FIG. 4 in phantom lines. In-phase displacements of the movable ends 174 between the pair of actuators 170 and 170 allow the mirror 92, which is coupled at its opposite ends to the pair of beams 150 and 150, to be translated perpendicularly to a reflective surface 180 of the mirror 92.

As illustrated in FIG. 4, upon voltage application to the pair of actuators 170 and 170, the mirror 92 is translated from an initial position depicted in FIG. 4 in solid lines, to an actuated position having the displacement amount variable as a function of the level of the applied voltage. The initial position corresponds to the position of the mirror 92 depicted in FIG. 2(a), while the displaced position corresponds to the position of the mirror 92 depicted in FIG. 2(b).

It is added that, in the present embodiment, for the mirror 92 to be translated, the four actuators 170 are activated concurrently due to voltage application.

However, the present invention may be practiced in an arrangement in which, voltages are applied to one of two pairs of actuators 170 (in total, four actuators), for translation of the mirror 92, while rigidity control is performed by the other pair of actuators 170, through voltage control or temperature control, for tilt adjustment of the mirror 92. An optical sensor is preferably used to detect the tilt of the mirror 92 by an optical sensor, for the tilt adjustment of the mirror 92.

Figure 5:
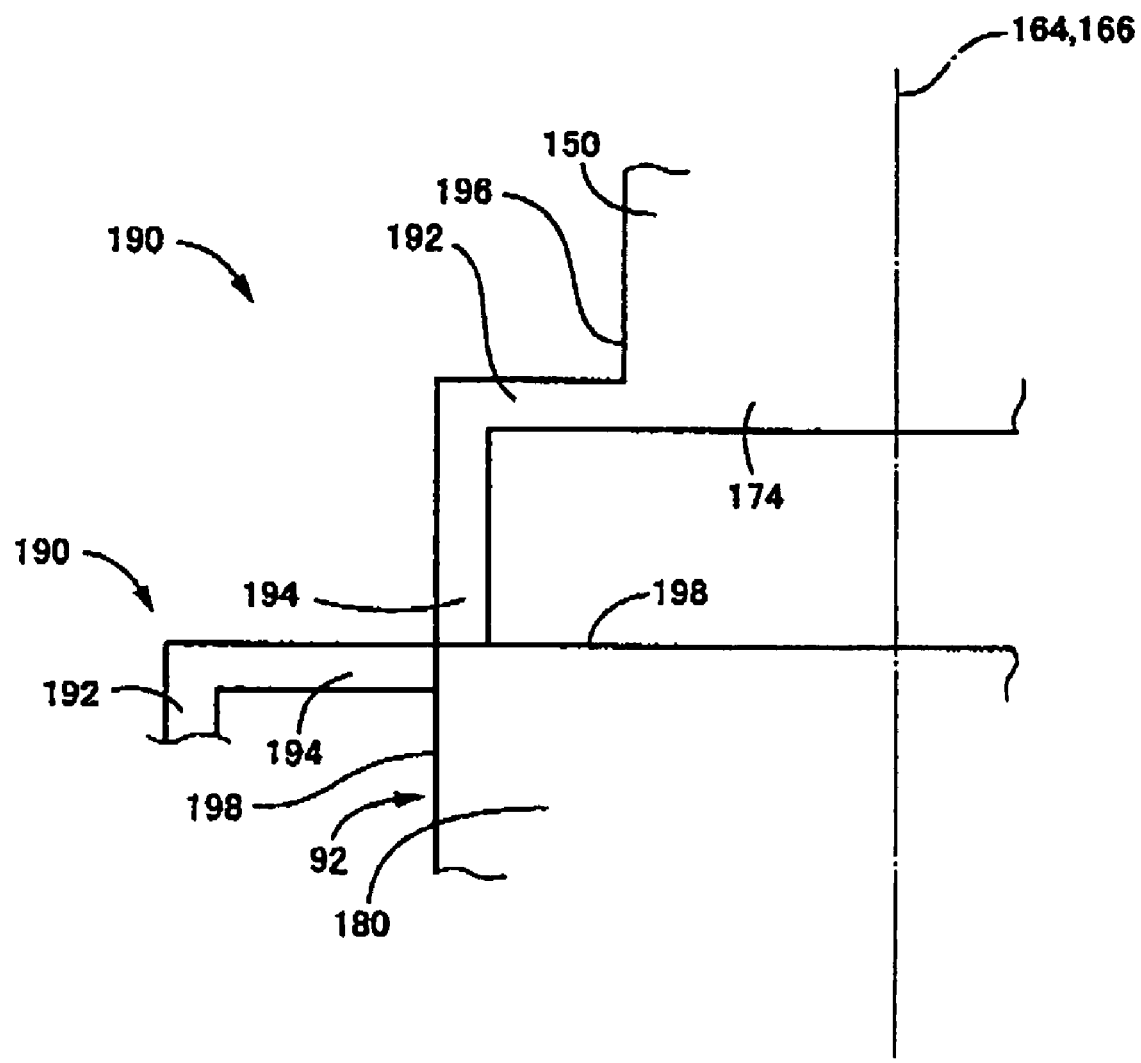
FIG. 5 is an enlarged top plan view illustrating joints 190 of the mirror driver 96 depicted in FIG. 3.

Referring next to FIG. 5, there is illustrated in top plane view in enlargement, joints 190 for integrally coupling the beams 150 and the mirror 92. As illustrated in FIG. 3, the joints 190 are provided to the beams 150, with each beam 150 having two joints 190.

Per each beam 150, the joints 190 are provided to opposite lateral sides of each beam 150, with each lateral side having one joint 190. Each joint 190 is provided for achieving flexible hinges allowing conversion of bending motion of the corresponding beam 150 to a translational motion of the mirror 92 in a direction perpendicular to the reflective surface 180.

Each joint 190 is designed to have rigidity to resist deformation less than the rigidity of a corresponding one of the beam 150 to which each joint 190 is attached, and less than the rigidity of the mirror 92. In the description of the present embodiment, the term "rigidity to resist deformation" is defined to include flexural rigidity and torsional rigidity.

As illustrated in FIG. 5, each joint 190 is in the form of a beam constructed by coupling two plate-shaped beam portions 192 and 194 extending non-rectilinearly and being confined in a flat plane. Each joint 190 is dimensioned to have the total length larger than a minimum distance between the mirror 92 and one of the beams 150 which is to be coupled to the mirror 92. The minimum distance is measured along a corresponding one of the first and second reference lines 164 and 166 (hereinafter, referred to as "corresponding reference line").

As illustrated in FIG. 5, those two beam portions 192 and 194 are comprised of a beam-side beam portion 192 and a mirror-side beam portion 194.

The beam-side beam portion 192 extends from the movable end 174 (free end) of the corresponding beam 150 at one of its opposite lateral side faces 196 and 196, in a direction perpendicular to the aforementioned corresponding reference line. The perpendicular direction is an example of the "direction having a major component perpendicular to the reference line" set forth in the above mode (7).

The mirror-side beam portion 194 extends from one of four side faces 198 of the mirror 92 which faces the corresponding beam 150, in a direction parallel to the aforementioned corresponding reference line. The parallel direction is an example of the "direction having a major component parallel to the reference line" set forth in the above mode (7).

As illustrated in FIG. 5, the beam-side beam portion 192 and the mirror-side beam portion 194 are integrally coupled to each other so as to extend along an L-shaped bent elongation path.

As illustrated in FIG. 5, two mirror-side beam portions 194 and 194 which belong to the same one of the beams 150 are disposed on one of the four side faces 198 which faces the one beam 150, at respective two positions located on the one side face 198 and spaced apart by a maximum distance.

In the present embodiment, the beam-side beam portion 192 and the mirror-side beam portion 194 are shaped so as to be identical in width dimension to each other. Further, the beam-side beam portion 192 is shaped so as to have a length smaller than that of the mirror-side beam portion 194.

Additionally, each beam 150 is shaped so as to have a width dimension smaller than that of the mirror 92. Still additionally, the mirror 92 is shaped so as to have a thickness larger than that of each beam 150.

As will be evident from the above explanation, in the present embodiment, the joints 190 integrally couple the mirror 92 having the reflective mirror 180 to be held flat during translation of the mirror 92, and the beams 150 to be bent, to each other.

As described above, each joint 190 has the rigidity to resist deformation less than the rigidity of its neighboring areas. Further, each joint 190 is constructed by integrally coupling two beam portions, which is to say, the beam-side beam portion 192 and the mirror-side beam portion 194 to each other, such that the beam-side beam portion 192 and the mirror-side beam portion 194 extend along an L-shaped bent elongation path.

As described conceptually, as a result of the above configuration, during bending of the beams 150, the joints 190 are caused to be bent, in such a manner as a portion of each joint 190 at which the beam-side beam portion 192 and the mirror-side beam portion 194 are coupled to each other, acts as an articulation.

Therefore, each joint 190 operates so as to allow conversion of approximate rectilinear movement of each beam 150 at its movable end 174 to rectilinear movement of the mirror 92, with higher precedence over transmission of a bending moment of each beam 150 to the mirror 92. In other words, each joint 190 operates to achieve a rotary joint approximately.

Further, in the present embodiment, the bending motions of each beam 150 is not fully transmitted to the mirror 92, but partially converted into torsional motions of each beam-side beam portion 192.

Therefore, the present embodiment would allow the mirror 92 to be translated with its reduced bending deformation irrespective of utilization of bending motions of the beams 150 for translation of the mirror 92.

Additionally, the present embodiment would allow a reduction in a bending moment of the mirror 92 caused by the bending motions of the beams 150.

There is the possibility that bending moments having opposite directions are generated at the mirror 92 by a pair of beams 150 and 150 which are diametrically opposed to each other with the mirror 92 inbetween the pair of beams 150 and 150. The possibility invites the likelihood that the pair of beams 150 and 150 are interfered with each other with respect to the bending motions.

The interference of bending motions between the pair of beams 150 and 150 loses a displacement amount of the mirror 92. Compensation for the loss requires, for example, an increase in the ability of the actuators 170 to bend the beams 150.

However, when the actuators 170 are in the form of, for example, piezoelectric materials, an increase in the ability of the actuators 170 to bend the beams 150 may lead to a collateral increase in power consumption.

In contrast, the present embodiment, because of bending moment generated at the mirror 92 being completely zero or small, if any, would not require great concerns about a possible reduction in a displacement amount of the mirror due to the mutual interference between the pair of beams 150 and 150.

Therefore, the present embodiment would make it easier to displace the mirror 92 with a large amount for the ability of the actuators 170 to bend the beams 150. For example, the present embodiment would make it easier to achieve a displacement amount of the mirror 92 which is large for the levels of voltages applied to piezoelectric materials of the actuators 170 and the power consumption.

Figure 6:
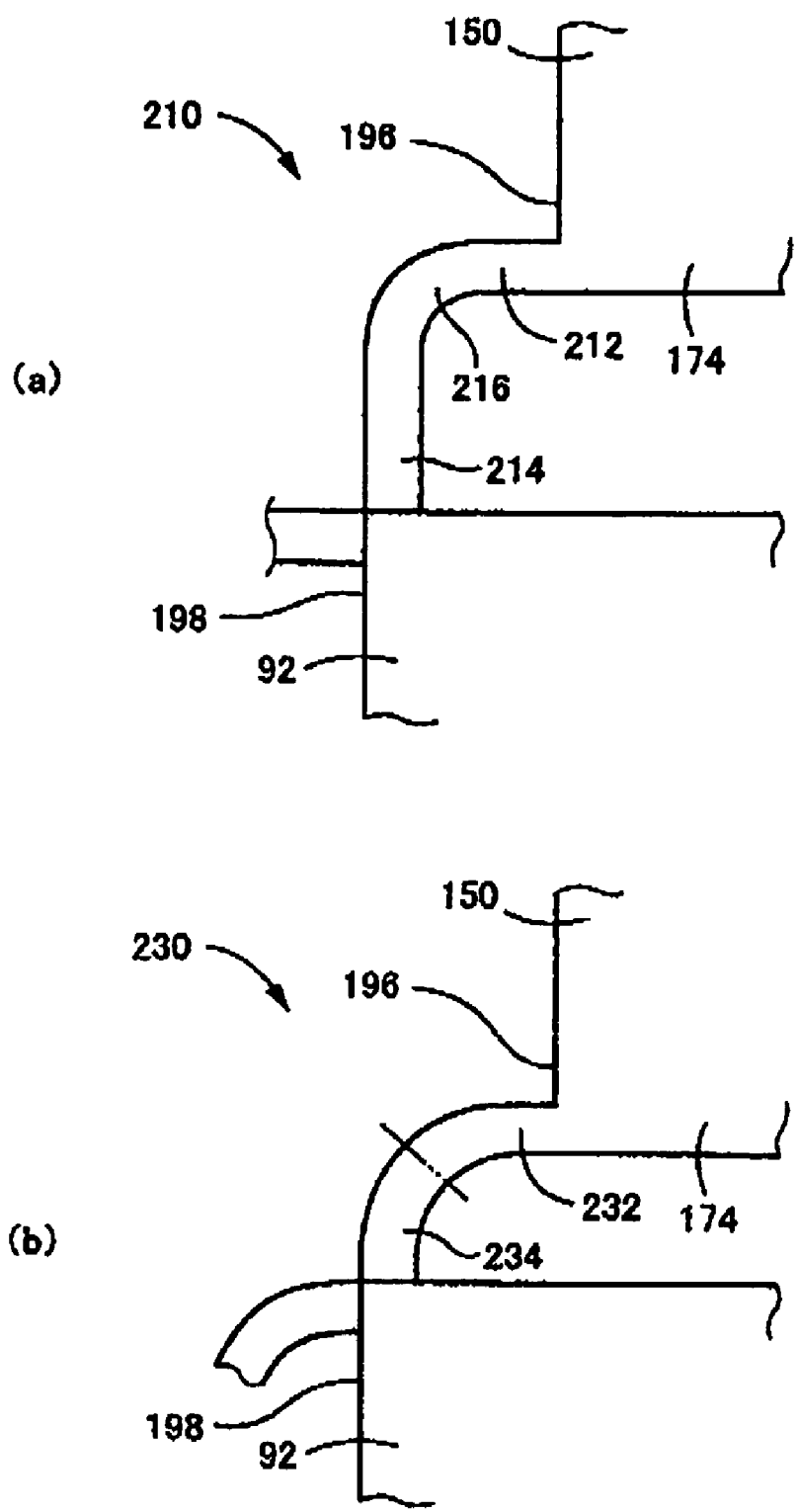
FIG. 6(a) is a top plan view illustrating an example of a modified version of the joints 190 depicted in FIG. 5.
FIG. 6(b) is a top plan view illustrating an example of an alternative modified version of the joints 190 depicted in FIG. 5.

Referring next to FIG. 6(*a*), there is illustrated an example of a modified version of the joints 190 as joints 210.

In each joint 210, a rectilinear beam-side beam portion 212 and a rectilinear mirror-side beam portion 214 are integrally coupled to each other via a curved portion 216 (e.g., a portion extending along an arc).

Referring next to FIG. 6(*b*), there is illustrated an example of an alternative modified version of the joints 190 as joints 230.

In each joint 230, a curved beam-side beam portion 232 and a curved mirror-side beam portion 234 are integrally coupled to each other. For each joint 230, the beam-side beam portion 232 and the mirror-side beam portion 234 cooperate to form a single arc.

Figure 7:
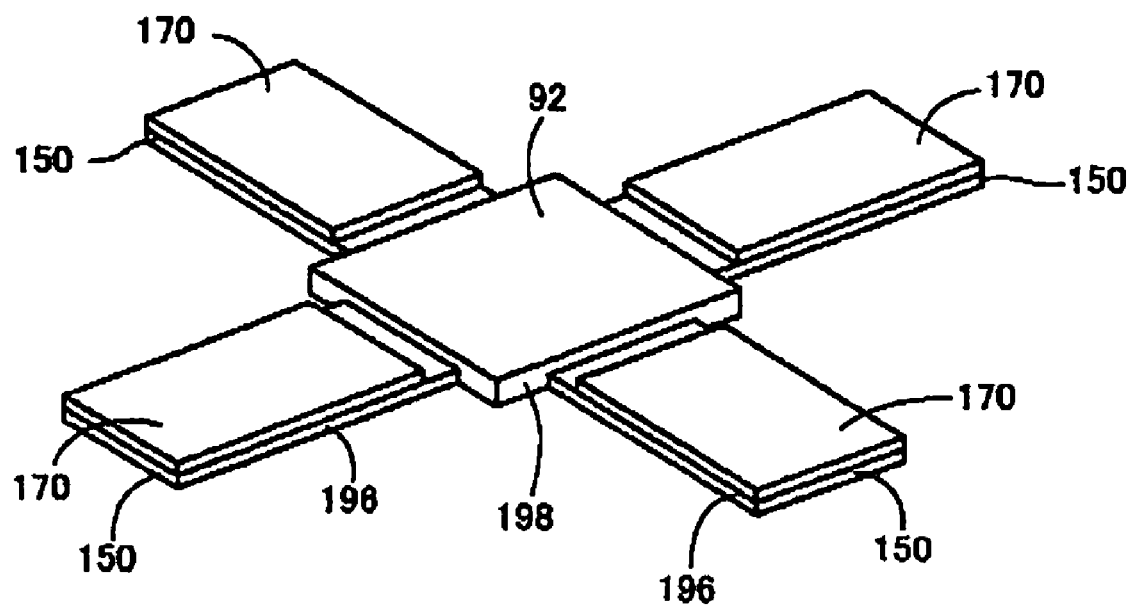
FIG. 7 is a perspective view illustrating a comparative example of the mirror driver 96 depicted in FIG. 3.

Referring then to FIG. 7, there is illustrated in perspective view a comparative example of the mirror driver 96 according to the present embodiment, in an assembled state, similarly with FIG. 3(*b*).

This comparative example is in common to the present embodiment, in that the four plate-shaped beams 150 are disposed at the plate-shaped mirror 92 so as to be coplanar with the mirror 92 and so as to extend radially outwardly of the mirror 92 with the four beams 150 being uniformly disposed around the mirror 92.

However, in this comparative example, the mirror 92 and the plate-shaped beams 150 extending rectilinearly with its uniform cross-section are coupled to each other integrally and directly, without intervention of any hinges.

Figure 8:
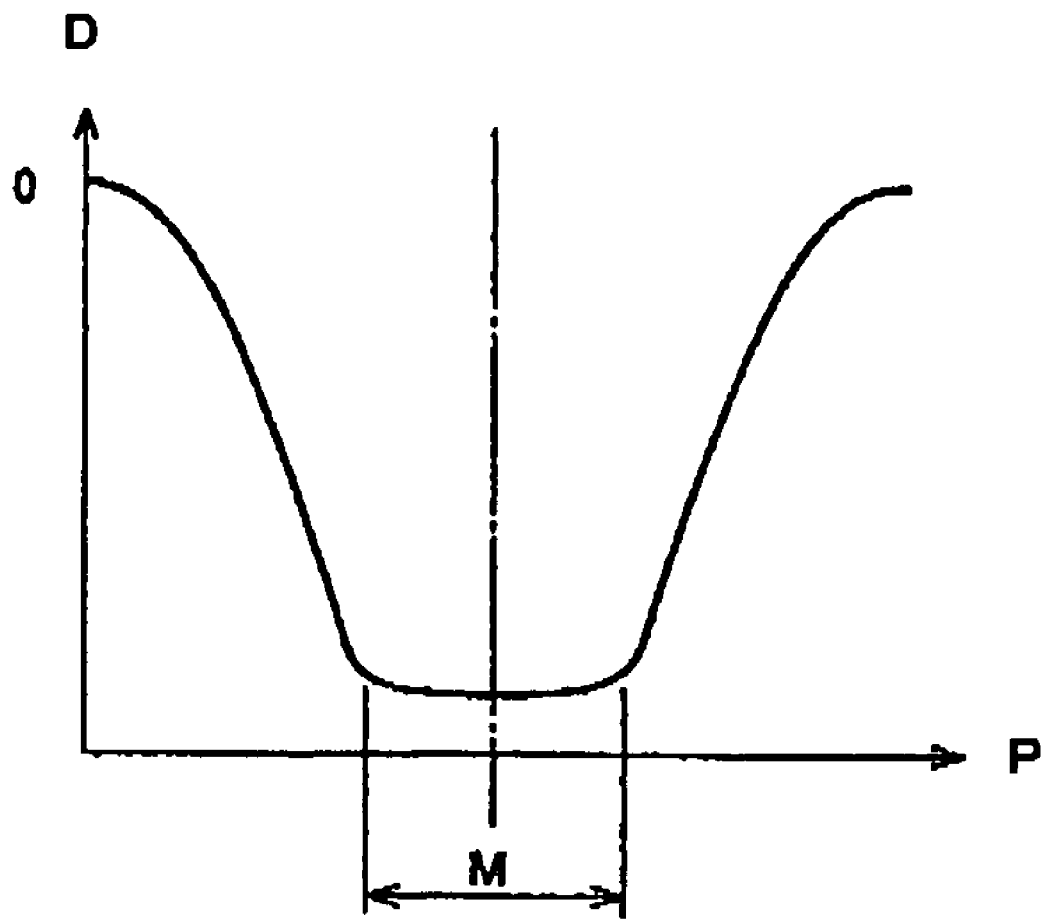
FIG. 8 is a graph for demonstrating that, in the comparative example depicted in FIG. 7, a mirror 92 is displaceable in the presence of deformation of the mirror 92.

On the graph of FIG. 8, there are plotted the displacement amounts of the first beam pair 160 and the mirror 92 when actuated, which are measured at positions disposed on the first beam pair 160 and the mirror 92 and in a linear array along the first reference line 164, with respect to when the first beam pair 160 and the mirror 92 are placed in a normal state (i.e., an unactuated state).

The graph has a vertical axis indicative of the displacement D, and a horizontal axis indicative of the position P on the first reference line 164. On the graph, a local region of the total domain of variability of the position P which is assigned to the mirror 92 is denoted by "M."

This graph evidently demonstrates that, in the aforementioned comparative example, the mirror 92, upon being actuated, is bent (or warped).

Figure 9:
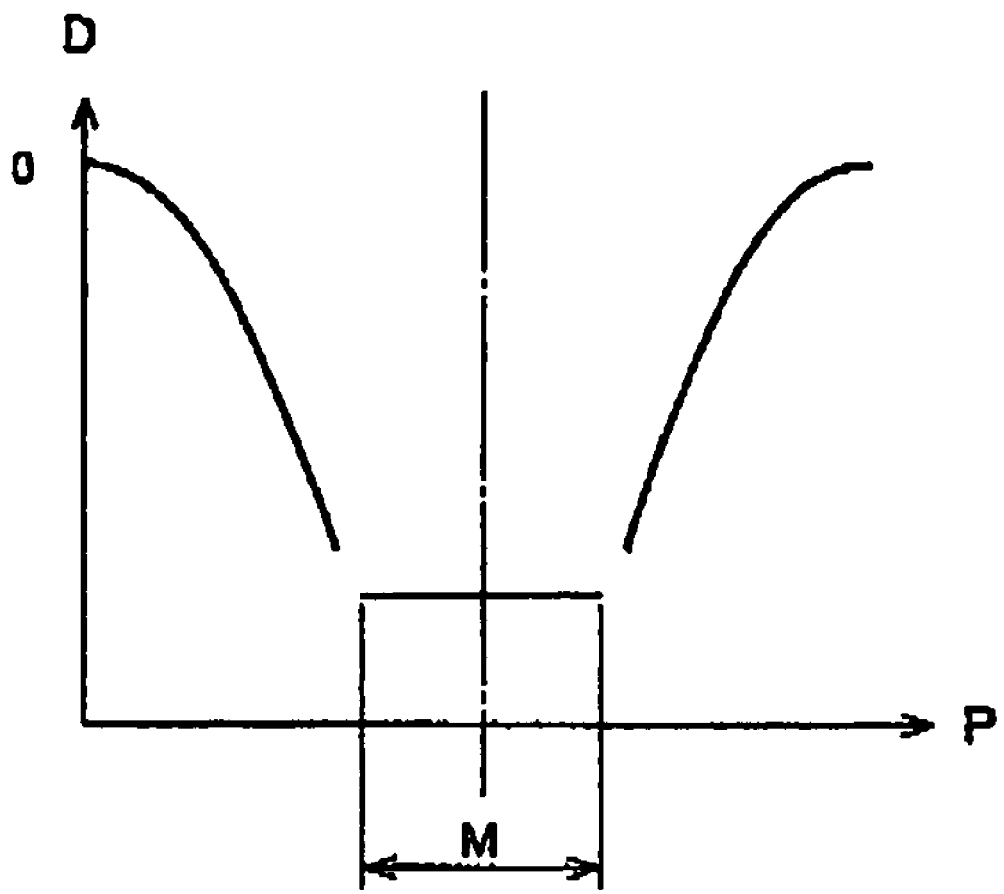
FIG. 9 is a graph for demonstrating that, in the mirror driver depicted in FIG. 3, the mirror 92 is displaceable in the absence of deformation of the mirror 92.

In contrast, in FIG. 9, a graph for the mirror driver 96 according to the present embodiment is illustrated similarly with that of FIG. 8. On the graph of FIG. 9, at opposite end portions of the region M, there are areas in which no displacement D is plotted, as opposed to the graph of FIG. 8.

This is because there are spatial gaps between the mirror 92 and the beams 150 as viewed along the first reference line 164, as illustrated in FIG. 3, resulting in the creation of sites where no phenomena of displacement cannot occurs.

As will be evident from the graph of FIG. 9, the present embodiment would avoid the mirror 92 when actuated from being bent. As a result, the reflective surface 180 of the mirror 92 is held flat, either when the mirror 92 is actuated or not.

As will be evident from the above explanation, in the present embodiment, one of the first and second beam pairs 160 and 162 constitutes an example of the "pair of beams" set forth in the above mode (1), and the other constitutes an example of the "additional pair of beams" set forth in the above mode (11).

Further, in the present embodiment, one of the first and second reference lines 164 and 166 constitutes an example of the "reference line" set forth in the above mode (1), and the other constitutes an example of the "additional reference line" set forth in the above mode (11).

Still further, in the present embodiment, four of all the joints 190 (two for one beam 150) which couples one of the first and second beam pairs 160 and 162 and the mirror 92 to each other together constitute an example of the "pair of joints" set forth in the above mode (1), and the remaining four joints 190 (two for one beam 150) which couples the other of the first and second beam pairs 160 and 162 and the mirror 92 to each other together constitute an example of the "additional pair of joints" set forth in the above mode (11).

Additionally, in the present embodiment, two of all the actuators 170 together constitute an example of the "actuator" set forth in the above mode (1), and the remaining two actuators 170 and 170 together constitute an example of the "additional actuator" set forth in the above mode (11).

Still additionally, in the present embodiment, a portion of the signal processing device 39 which is assigned to supply a depth signal (a driving signal) to each actuator 170 to thereby control a bend of each actuator 170 constitutes an example of the "controller" set forth in the above mode (13).

Yet still additionally, in the present embodiment, each laser 30, 32, 34 constitutes an example of the "light source" set forth in the above mode (16), the wavefront-curvature modulator 22 constitutes an example of the "wavefront-curvature modulator" set forth in the same mode, and the scanner 24 constitutes an example of the "scanner" set forth in the same mode.

Further, in the present embodiment, the wavefront-curvature modulator 22 is configured to include the mirror driver 96 which constitutes an example of the "mirror driver" constructed according to any one of the above mode (1)-(13).

It is added that, in the present embodiment, a pair of beams 150 and 150 which are diametrically disposed to each other with the mirror 92 being interposed between the beams 150 and 150 are caused to bend in the same directions, to thereby cause the mirror 92 to perform a translational motion which is an example of a rigid-body motion, for wavefront-curvature modulation.

Alternatively, the present invention may be practiced in an arrangement in which, with one of the two beam pairs 160 and 162 being removed from the mirror driver 96 depicted in FIG. 3(b), only one pair of beams 150 and 150 remain so as to be diametrically opposed to each other with the mirror 92 inbetween. The pair of beams 150 and 150 are caused to bend in opposite directions, to thereby cause the mirror 92 to perform an angular oscillation which is an example of a rigid-body motion.

In this arrangement, the mirror 92 is angularly oscillated about an oscillation axis oriented perpendicular to a common center line of the pair of beam 150 and 150 and also parallel to the reflective surface 180 of the mirror 92 when relaxed. This arrangement may be employed for scanning reflected light from the reflective surface 180.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A mirror driver comprising:
a mirror having a reflective surface reflecting incident light thereon;
a pair of mechanical beams diametrically opposed to each other with the mirror inbetween as viewed along a reference line parallel to the reflective surface;
an actuator imparting bending motions to the pair of beams, respectively; and
a pair of joints integrally coupling the pair of beams and the mirror to each other, with less rigidity to resist deformation than rigidity of the pair of beams and the mirror, for allowing conversion of the bending motions of the pair of beams into a rigid-body motion of the mirror without inducing an angular oscillation about the reference line,
wherein each of the pair of joints is configured to include a beam-side beam portion proximate to a corresponding one of the pair of beams, and a mirror-side beam portion proximate to a corresponding one of opposite ends of the mirror, such that the beam-side beam portion and the mirror-side beam portion are coupled to each other integrally and non-rectilinearly,
the beam-side beam portion extends from one of opposite ends of the corresponding beam, which is proximate to the mirror, the one end of the corresponding beam being a mirror-side end of the corresponding beam,
the mirror-side end of the corresponding beam has lateral faces opposite to each other in a width direction of the corresponding beam,
the beam-side beam portion of each joint includes a pair of coextending beam-side beam elements, and
the pair of beam-side beam elements are attached to the opposite lateral faces of the mirror-side end of the corresponding beam, respectively, with the pair of beam-side beam elements being spaced apart in a direction parallel to the width direction of the corresponding beam.

2. The mirror driver according to claim 1, wherein the rigid-body motion includes at least one of a translational motion of the mirror in a direction perpendicular to the reflective surface, and an angular oscillation of the mirror about an oscillation axis perpendicular to the reference line.

3. The mirror driver according to claim 1, wherein the beam-side beam portion and the mirror-side beam portion have different lengths.

4. The mirror driver according to claim 1, wherein the beam-side beam portion and the mirror-side beam portion have respective center lines extending in different directions.

5. The mirror driver according to claim 4, wherein the beam-side beam portion extends from the corresponding beam in a direction having a major component perpendicular to the reference line, and the mirror-side beam portion extends from the mirror in a direction having a major component parallel to the mirror.

6. The mirror driver according to claim 1, wherein the mirror-side beam portion extends from one of the opposite ends of the mirror, which is proximate to the corresponding beam, the opposite ends of the mirror being spaced apart in the direction of the reference line, the one end of the mirror being a beam-side end of the mirror.

7. The mirror driver according to claim 6, wherein the beam-side end of the mirror has a front face facing the beam-side end of the corresponding beam, the mirror-side beam portion of each joint includes a pair of coextending mirror-side beam elements, and the pair of mirror-side beam elements are attached to the front face of the beam-side end of the mirror, with the pair of mirror-side beam elements being spaced apart in the width direction of the corresponding beam, by a distance larger than a width of the corresponding beam.

8. The mirror driver according to claim 1, wherein each of the pair of beams has a width smaller than that of the mirror.

9. The mirror driver according to claim 1, further comprising:

an additional pair of mechanical beams diametrically opposed to each other with the mirror inbetween as viewed along an additional reference line parallel to the reflective surface and perpendicular to the original reference line;

an additional actuator imparting bending motions to the additional pair of beams, respectively; and an additional pair of joints integrally joint the additional pair of beams and the mirror to each other, with less rigidity to resist deformation than rigidity of the additional pair of beams and the mirror.

10. The mirror driver according to claim 1, wherein the pair of joints are configured to allow conversion of the bending motions of the pair of beams into a translational motion of the mirror in a direction perpendicular to the reflective surface of the mirror.

11. The mirror driver according to claim 10, which is used in combination with a lens, the mirror driver further comprising a controller controlling a distance between the lens and the mirror, by causing the actuator to bend the pair of beams, to thereby modulate a curvature of wavefront of light upon entry from the lens into the mirror.

12. The mirror driver according to claim 1, wherein the pair of joints are configured to allow conversion of the bending motions of the pair of beams into an angular oscillation of the mirror about an oscillation axis perpendicular to the reference line.

13. The mirror driver according to claim 12, which is used for varying a reflection direction of reflected light from the mirror, to thereby scan the reflected light.

14. A mirror driver comprising:

a mirror having a reflective surface reflecting incident light thereon;

a pair of mechanical beams diametrically opposed to each other with the mirror inbetween as viewed along a reference line parallel to the reflective surface;

an actuator imparting bending motions to the pair of beams, respectively; and a pair of joints integrally coupling the pair of beams and the mirror to each other, with less rigidity to resist deformation than rigidity of the pair of beams and the mirror, each joint having a length larger than a minimum distance left between a corresponding one of the pair of beams and a corresponding one of opposite ends of the mirror, the length of each joint being measured in an elongation direction of each joint, the minimum distance being measured along the reference line, wherein each of the pair of joints is configured to include a beam-side beam portion proximate to a corresponding one of the pair of beams, and a mirror-side beam portion proximate to a corresponding one of opposite ends of the mirror, such that the beam-side beam portion and the mirror-side beam portion are coupled to each other integrally and non-rectilinearly, the beam-side beam portion extends from one of opposite ends of the corresponding beam, which is proximate to the mirror, the one end of the corresponding beam being a mirror-side end of the corresponding beam, the mirror-side end of the corresponding beam has lateral faces opposite to each other in a width direction of the corresponding beam, the beam-side beam portion of each joint includes a pair of coextending beam-side beam elements, and the pair of beam-side beam elements are attached to the opposite lateral faces of the mirror-side end of the corresponding beam, respectively, with the pair of beam-side beam elements being spaced apart in a direction parallel to the width direction of the corresponding beam.

15. The mirror driver according to claim 14, wherein the beam-side beam portion and the mirror-side beam portion have different lengths.

16. The mirror driver according to claim 14, wherein the beam-side beam portion and the mirror-side beam portion have respective center lines extending in different directions.

17. The mirror driver according to claim 16, wherein the beam-side beam portion extends from a corresponding one of the pair of beams so as to be oriented in a direction having a major component perpendicular to the reference line, and the mirror-side beam portion extends from the mirror so as to be oriented in a direction having a major component parallel to the mirror.

18. A retinal scanning display for two-dimensionally scanning a light beam on a retina of a viewer, to thereby directly project a desired image onto the retina, the display comprising:

a light source emitting the light beam;

a wavefront-curvature modulator modulating a curvature of wavefront of the light beam emitted from the light source; and a scanner two-dimensionally scanning the modulated light, wherein at least one of the wavefront-curvature modulator and the scanner is configured to include a mirror driver, and the mirror driver includes:

a mirror having a reflective surface reflecting incident light thereon;

a pair of mechanical beams diametrically opposed to each other with the mirror inbetween as viewed along a reference line parallel to the reflective surface;

an actuator imparting bending motions to the pair of beams, respectively; and a pair of joints integrally coupling the pair of beams and the mirror to each other, with less rigidity to resist deformation than rigidity of the pair of beams and the mirror, for allowing conversion of the bending motions of the pair of beams into a rigid-body motion of the mirror without inducing an angular oscillation about the reference line, wherein each of the pair of joints is configured to include a beam-side beam portion proximate to a corresponding one of the pair of beams, and a mirror-side beam portion proximate to a corresponding one of opposite ends of the mirror, such that the beam-side beam portion and the mirror-side beam portion are coupled to each other integrally and non-rectilinearly, the beam-side beam portion extends from one of opposite ends of the corresponding beam, which is proximate to the mirror, the one end of the corresponding beam being a mirror-side end of the corresponding beam, the mirror-side end of the corresponding beam has lateral faces opposite to each other in a width direction of the corresponding beam, the beam-side beam portion of each joint includes a pair of coextending beam-side beam elements, and the pair of beam-side beam elements are attached to the opposite lateral faces of the mirror-side end of the corresponding beam, respectively, with the pair of beam-side beam elements being spaced apart in a direction parallel to the width direction of the corresponding beam.

* * * * *